(12) United States Patent
Zheng

(10) Patent No.: US 8,459,653 B2
(45) Date of Patent: Jun. 11, 2013

(54) SEAL ASSEMBLY SEGMENT JOINTS

(75) Inventor: Xiaoqing Zheng, Schnectady, NY (US)

(73) Assignee: General Electric Company, Schenectady, NY (US)

(*) Notice: Subject to any disclaimer, the term of this patent is extended or adjusted under 35 U.S.C. 154(b) by 190 days.

(21) Appl. No.: 12/940,220

(22) Filed: Nov. 5, 2010

(65) Prior Publication Data

US 2012/0114466 A1 May 10, 2012

(51) Int. Cl.
*F01D 11/02* (2006.01)
*F16J 19/00* (2006.01)
*F16J 15/34* (2006.01)

(52) U.S. Cl.
USPC .................... 277/355; 277/346; 277/364

(58) Field of Classification Search
CPC ....... F16J 15/3288; F16J 15/442; F01D 11/001
USPC ........ 277/346, 347, 355, 416, 493, 496–499, 277/546–547, 631
See application file for complete search history.

(56) References Cited

U.S. PATENT DOCUMENTS

| | | | |
|---|---|---|---|
| 3,124,502 A * | 3/1964 | Radke | 428/66.4 |
| 3,235,275 A * | 2/1966 | Hart | 277/546 |
| 4,082,296 A * | 4/1978 | Stein | 277/400 |
| 5,058,904 A * | 10/1991 | Nevola | 277/370 |
| 5,201,530 A | 4/1993 | Kelch et al. | |
| 5,749,584 A * | 5/1998 | Skinner et al. | 415/173.5 |
| 5,971,400 A * | 10/1999 | Turnquist et al. | 277/416 |
| 6,030,175 A * | 2/2000 | Bagepalli et al. | 415/173.3 |
| 6,139,019 A * | 10/2000 | Dinc et al. | 277/355 |
| 6,318,728 B1 * | 11/2001 | Addis et al. | 277/355 |
| 6,367,806 B1 * | 4/2002 | Turnquist et al. | 277/355 |
| 6,550,777 B2 * | 4/2003 | Turnquist et al. | 277/355 |
| 7,032,903 B1 * | 4/2006 | Dalton et al. | 277/355 |
| 7,168,708 B2 * | 1/2007 | Dalton et al. | 277/355 |
| 7,631,879 B2 | 12/2009 | Diantonio | |
| 8,205,891 B2 * | 6/2012 | Vasagar | 277/585 |
| 2002/0105146 A1 * | 8/2002 | Uehara et al. | 277/355 |
| 2007/0079493 A1 | 4/2007 | Couture et al. | |

FOREIGN PATENT DOCUMENTS

| | | |
|---|---|---|
| EP | 0989-342 A2 | 3/2000 |
| WO | 01/76348 A2 | 10/2001 |

OTHER PUBLICATIONS

French Preliminary Search Report & Written Opinion, dated Jan. 29, 2013, pp. 1-4.

* cited by examiner

*Primary Examiner* — Vishal Patel
*Assistant Examiner* — Nathan Cumar
(74) *Attorney, Agent, or Firm* — Sutherland Asbill & Brennan LLP

(57) ABSTRACT

The present application provides a sealing assembly for use between a first component and a second component of a rotary machine. The sealing assembly may include a first sealing segment having a first end with a first angled surface and a second sealing segment having a second end with a second angled surface. The first angled surface of the first end of the first sealing segment meets the second angled surface of the second end of the second sealing segment at a joint.

15 Claims, 2 Drawing Sheets

SEAL ASSEMBLY SEGMENT JOINTS

TECHNICAL FIELD

The present application relates generally to a rotary machine and more particularly relates to a seal assembly for use between the components of a rotary machine having segment with split joints so as to limit axial and radial leakage therethrough.

BACKGROUND OF THE INVENTION

In rotary machines such as steam turbines and the like, a seal assembly may be used to form a seal between two stationary components and/or between a stationary component and a rotating component so as to limit leakage therethrough. Such a seal assembly may have a number of arcuate sealing segments positioned adjacent to each other. The sealing segments generally may be disposed in an annular groove of one of the components. Each sealing segment further may have a sealing face in opposition to the other component. The sealing function may be achieved by creating relatively tight clearances between the sealing face of the sealing segments and the opposing components. Other types of sealing assembly configurations and components may be known.

During operation of the rotary machine, and more particularly during startup, shut down, and/or other transient operations, the components of the sealing assembly may experience different thermal expansion rates. These expansion rates may impact the spacing between the sealing segments as the components expand and contract and may lead to leakage therethrough. For example, inner-segment gap leakage may be the main source of leakage in many "zero leakage" seals that may be used about first nozzle locations and the like for many steam turbines. Inter-segment gap leakage has become a significant issue given the use of ever tighter radial clearances. Minimizing leakage between the sealing segment gaps thus may improve overall rotary machine performance and efficiency.

Segmented seals for use between a first component and a second component of a rotary machine usually are designed to have butt gaps between segments so that they will not go arch-bound and open up a radial clearance at the sealing face with leakage therethrough. In clearance seals, the butt gap leakage is relatively small, but it can become significant if the seal teeth clearance is reduced, such as in the "zero clearance" seal case where the seal teeth are in contact with their mating sealing surface because of the relatively slow motion therebetween. Because the leakage across the seal teeth became very small, the butt gap leakage becomes a main source of leakage.

There is thus a desire therefore for an improved sealing assembly that may limit inter-segment leakage therethrough as well as adequately accommodating differing thermal conditions. Such an improved sealing assembly also would improve overall machine performance and efficiency with the use of inexpensive and reliable components.

SUMMARY OF THE INVENTION

The present application thus provides a sealing assembly for use between a first component and a second component of a rotary machine. The sealing assembly may include a first sealing segment having a first end with a first angled surface and a second sealing segment having a second end with a second angled surface. The first angled surface of the first end of the first sealing segment meets the second angled surface of the second end of the second sealing segment at a joint extending from a radial sealing point to an axial sealing point.

The present application further provides a sealing assembly for use between a first component and a second component of a rotary machine. The sealing assembly may include a first sealing segment having a first end with a first angled surface and a female member and a second sealing segment having a second end with a second angled surface and a male member. The first angled surface and the female member of the first end of the first sealing segment meets the second angled surface and the male member of the second end of the second sealing segment at a joint extending from a radial sealing point to an axial sealing point.

The present application further provides a rotary machine. The rotary machine may include a first component, a second component, and a sealing assembly positioned between the first component and the second component. The sealing assembly may include a first sealing segment with a first angled surface and a second sealing segment with a second angled surface such that the first angled surface of the first sealing segment meets the second angled surface of the second sealing segment about a joint.

These and other features and improvements of the present application will become apparent to one of ordinary skill in the art upon review of the following detailed description when taken in conjunction with the several drawings and the appended claims.

DETAILED DESCRIPTION

Figure 1:
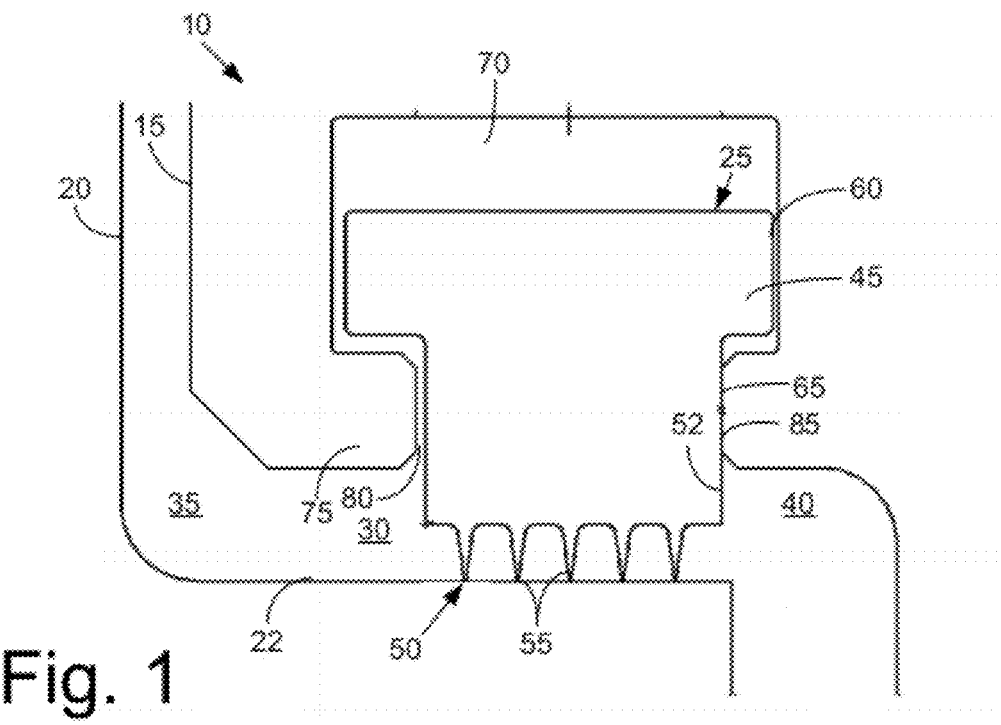
FIG. 1 is a cross-sectional view of a portion of a rotary machine with a known sealing assembly.

Referring now to the drawings, in which like numerals refer to like elements throughout the several views, FIG. 1 shows a cross-sectional view of a portion of a rotary machine 10 such as a steam turbine. Generally described, the rotary machine 10 may have a first stationary component 15 and a second stationary component 20 positioned adjacent to each other as is shown. To reduce leakage between the first stationary component 15 and the second stationary component 20, a seal assembly 25 may be provided at a component to component interface 30. The interface 30 may separate a high pressure region 35 and a lower pressure region 40.

The seal assembly 25 may be formed of an annular array of arcuate sealing segments 45. Each sealing segment 45 may have a sealing face 50 with a number of projecting sealing teeth 55. The sealing teeth 55 engage a mating surface 22 of the second stationary component 20 to form sealing points in the radial direction. A seal side surface 52 may be pushed by pressure loading to contact a mating surface 85 on the first stationary component 15 to form another sealing point in the axial direction. The sealing teeth 55 act as partial barriers to a fluid medium such as steam flowing from the high pressure region 35 to the low pressure region 40 and the contacting surfaces 52, 85 prevent any leakage in a radial direction. Any number of sealing segments 45 may be used herein. Other types of sealing assembly configurations and components also may be known.

The radial outer portion of the sealing segments 45 may include a pair of segment locating flanges 60. The flanges 60 may extend from the sealing segment 45 in an axial opposite direction away from one another. An axially reduced neck 65 may extend between the sealing face 50 and the flanges 60. The sealing segments 45 may be disposed in an angular groove 70 having a largely "T"-shaped cross-section within the first stationary component 15. The annular groove 70 may be defined along the radially inner most portion of the stationary component 15 by a pair of stationary component locating hooks 75. The locating hooks 75 may extend axially towards one another so as to define a slot 80 therebetween. The sealing segments 45 may be positioned such that the axially reduced neck 65 is fitted within the stationary component slot 80 for movement therein.

The sealing assembly 25 described herein may be useful with a wide variety of components of the rotary machine 10. Although the disclosure herein describes the use of two stationary components 15, 20, it is understood that the sealing assembly 25 also may be disposed between a stationary component and a rotating component such as between a turbine diaphragm and a shaft. Other types of components may be used herein. Furthermore, the radial positioning of the components 15, 20 may be flipped to have the seal pointing outward and have the seal mating surface at an outer side of the seal assembly 25. Furthermore, the two components 15, 20 also may be rotated into an axial facing position.

If no butt gap exists, the seal assembly 25 may separate the high pressure region 35 from the lower pressure region 40. When the component 20 shrinks relatively (or the seal 25 expands relatively) due to thermal and/or mechanical reasons, however, the seal segments 45 may go arch-bound and open up seal tooth clearance between the seal face 50 and the mating surface 22 on the component 20, resulting large increase of leakage.

Figure 2:
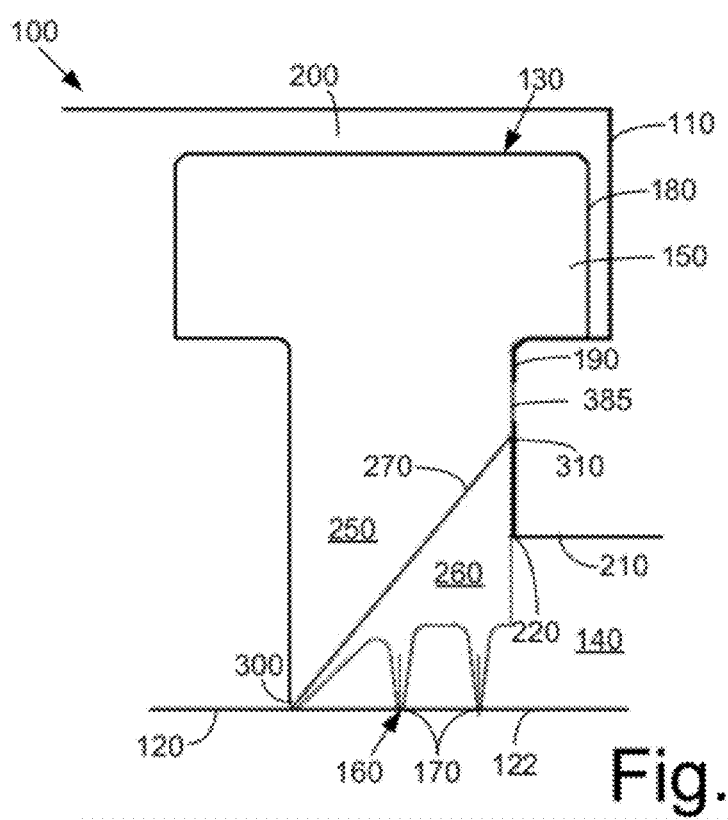
FIG. 2 is a cross-sectional view of a portion of a rotary machine with a sealing assembly as may be described herein.

FIG. 2 shows portions of a rotary machine 100 as may be described herein. As above, the rotary machine 100 may include a first component 110 and a second component 120. Likewise as described above, the components 110, 120 may be stationary and/or rotating. The rotary machine 100 may include a sealing assembly 130 positioned at an interface 140 between the components 110, 120. The sealing assembly 130 may include a number of arcuate sealing segments 150. Each sealing segment 150 may include a sealing face 160 with a number of sealing teeth 170 thereon. Any number of sealing teeth 170 may be used. Each sealing segment 150 likewise may include a pair of segment locating flanges 180 and an axially reduced neck 190. The sealing segments may be disposed within an annual groove 200 within the first component 110. The annular groove 200 may have a largely "T"-shaped cross-section. The annular groove 200 may be defined by a pair of first component locating hooks 210 that define a slot 220 therebetween. Other types of sealing assembly configurations and components may be used herein.

Figure 3:
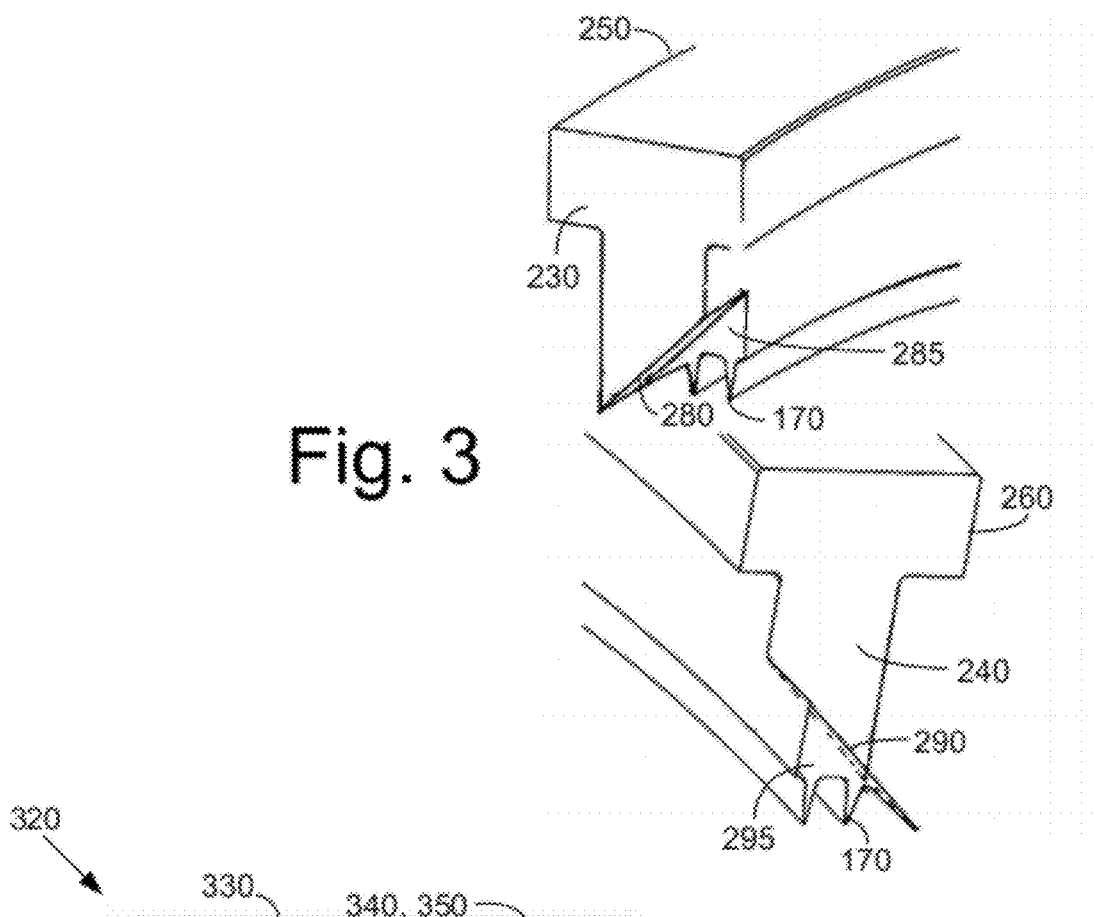
FIG. 3 is a perspective view of a pair of matching seal assembly segment surfaces.

Each sealing segment 150 may include a first end 230 and a second end 240 as is shown in FIG. 3. A first sealing segment 250 and a second sealing segment 260 may meet at a joint 270. Any number of the sealing segments 250 may be used herein. The first end 230 of the first sealing segment 250 may align with the second end 240 of the second sealing segment 260 along the joint 270. (The first end 230 and the second end 240 of the sealing segments 250 are described for purposes of relative positioning only. Either end may be a first end or a second end.)

As is shown in FIG. 3, the first end 230 of the first sealing segment 250 may include a first angled surface 280 while the second end 240 of the second sealing segment 260 may include a second angled surface 290. The first angled surface 280 and the second angled surface 290 are intended to be overlapping so as to form the joint 270 between the first sealing segment 250 and the second sealing segment 260. The first angled surface 280 may be a female member 285 and the second angled surface 290 may be a male member 295 (or vise versa).

A butt gap between the ends 230, 240 will allow the segments 250, 260 to slide against each other along the joint 270 without going arch-bound. Because the cross line of joint 270 starts from a radial sealing point 300 where both segment 250, 260 join as a combined tooth and engage with a mating surface 122 and ends at a axial sealing point 310 where both segment 250, 260 come into contact with another mating surface 385, the butt gap volume between the ends 230, 240 is therefore totally separated from a downstream butt gap volume between end members 285, 295. In this way, the space between segment ends is divided into two volumes and there is no open connection between the two volumes such that the butt gap is sealed. The angled surfaces 280, 290 may have different types of overlapping or complimentary configurations as long as they cover the space between the radial sealing point 300 and the axial sealing point 310. The angled surfaces 280, 290 may have any complimentary angles. Likewise, the female member 285 and the male member 295 may have any complimentary shape, depth, or other configuration.

The sealing assembly 130 described herein thus prevents gap leakage in both radial and axial directions. Significantly, the sealing assembly 130 requires no extra components or additional structure to prevent such leakage. Rather, the first angled surface 280 of the first end 230 of the first sealing segment 250 aligns with the second angled surface 290 of the second end 240 of the second sealing segment 260 to form a substantially leakage proof or leakage resistant joint 270. The sealing assembly 130 thus may improve overall rotary machine 100 performance, may be relatively low in cost, and may be easy to equip and implement. Moreover, the sealing assembly 130 may require little on-going maintenance.

Figure 4:
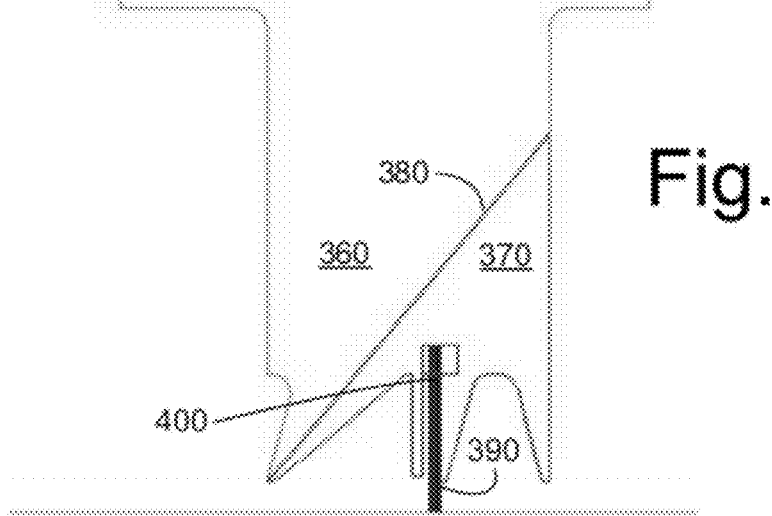
FIG. 4 is a side plan view of an alternative embodiment of a seal assembly as may be described herein.

FIG. 4 shows a further embodiment of a sealing assembly 320 as may be described herein. In this embodiment, the sealing assembly 320 also may include a number of arcuate sealing segments 330 with a first sealing segment 340 and a second sealing segment 350. Each of the sealing segments 340, 350 may have a first end 360 and a second end 370 as described above and meeting at a joint 380. One of the ends 360, 370 may include a brush seal 390. The brush seal 390 may extend from one of the ends 360, 370, extend along the length of the sealing segment 330, and terminate before the other end 360, 370. The end 370 on one of the adjacent segments also may include a recessed portion 400 to receive a circumferentially angled brush seal end that may extrude across a segment joint surface. Other configurations may be used herein.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

I claim:

1. A sealing assembly for use between a first component and a second component of a rotary machine, the sealing assembly comprising:
   a first sealing segment comprising a first end with a first angled surface forming a female member in the axial direction; and a second sealing segment comprising a second end with a second angled surface forming a male member configured to mate with the female member in the axial direction;

a plurality of sealing teeth extending from the first sealing segment and the second sealing segment, wherein the female member of the first sealing segment and the male member of the second sealing segment collectively form at least one of the plurality of sealing teeth; and a brush seal extending from the first sealing segment and the second sealing segment about the plurality of sealing teeth;

wherein the first angled surface of the first end of the first sealing segment meets the second angled surface of the second end of the second sealing segment at a joint extending in the axial direction from a radial sealing point to an axial sealing point.

2. The sealing assembly of claim 1, wherein the first sealing segment comprises a first segment second end with a first segment second angled surface.

3. The sealing assembly of claim 1, wherein the second sealing segment comprises a second segment first end with a second segment first angled surface.

4. The sealing assembly of claim 1, further comprising a plurality of sealing segments.

5. The sealing assembly of claim 4, wherein the plurality of sealing segments comprises a pair of locating flanges and a neck.

6. The sealing assembly of claim 1, wherein the first angled surface and the second angled surface extend along a tooth divided between the first sealing segment and the second sealing segment.

7. The sealing assembly of claim 1, wherein the joint extends from a high pressure side to a low pressure side of the first sealing segment and the second sealing segment.

8. A sealing assembly for use between a first component and a second component of a rotary machine, the sealing assembly comprising:

a first sealing segment comprising a first end with a first angled surface in the axial direction forming a female member;

a second sealing segment comprising a second end with a second angled surface in the axial direction and forming a male member; and a plurality of sealing teeth extending from the first sealing segment and the second sealing segment, wherein the female member of the first sealing segment and the male member of the second sealing segment collectively form at least one of the plurality of sealing teeth, wherein the first angled surface and the female member of the first end of the first sealing segment meets the second angled surface and the male member of the second end of the second sealing segment at a joint extending in the axial direction from a radial sealing point to an axial sealing point.

9. The sealing assembly of claim 8, wherein the first sealing segment comprises a first segment second end, a first segment second angled surface, and a first segment male member.

10. The sealing assembly of claim 8, wherein the second sealing segment comprises a second segment first end, a second segment first angled surface, and a second segment female member.

11. The sealing assembly of claim 8, further comprising a plurality of sealing segments.

12. The sealing assembly of claim 11, wherein the plurality of sealing segments comprises a pair of locating flanges and a neck.

13. The sealing assembly of claim 11, wherein the plurality of sealing segments comprises a brush seal thereon.

14. The sealing assembly of claim 8, wherein the first angled surface and the second angled surface extend along a tooth divided between the first sealing segment and the second sealing segment.

15. The sealing assembly of claim 8, wherein the joint extends from a high pressure side to a low pressure side of the first sealing segment and the second sealing segment.

* * * * *